June 23, 1942.  H. W. ALDEN  2,287,009
HUB CONSTRUCTION
Filed June 16, 1939    2 Sheets-Sheet 2
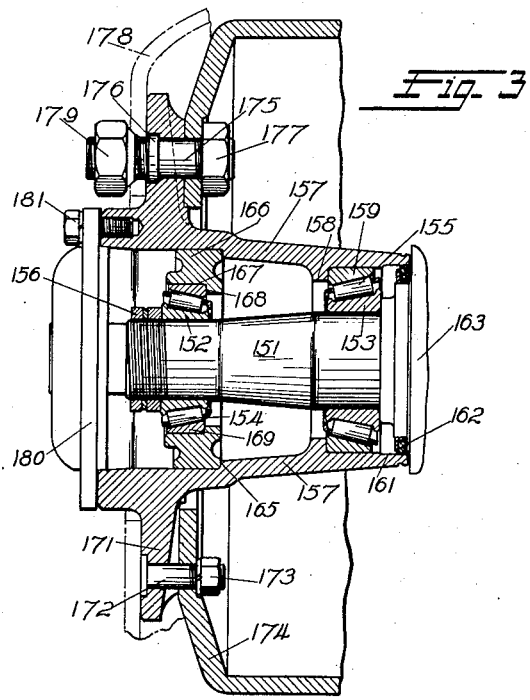
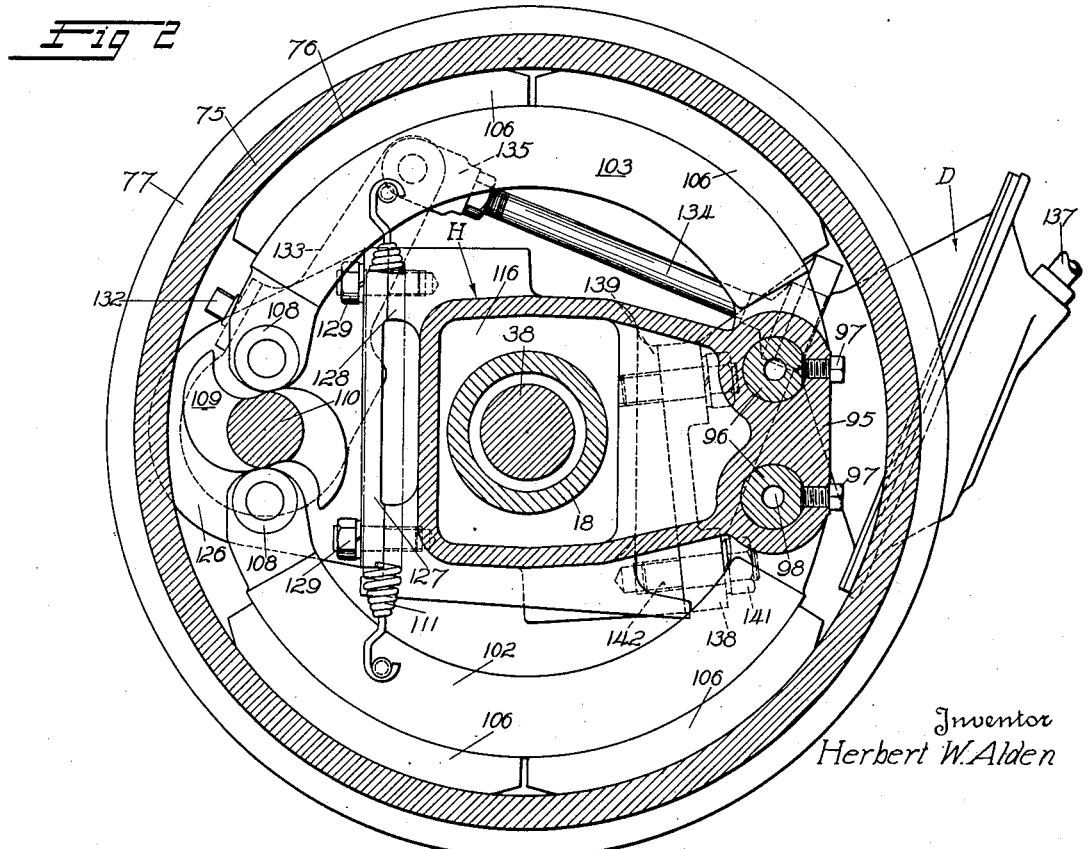
Inventor
Herbert W. Alden
By
Strauch & Hoffman
Attorneys Patented June 23, 1942

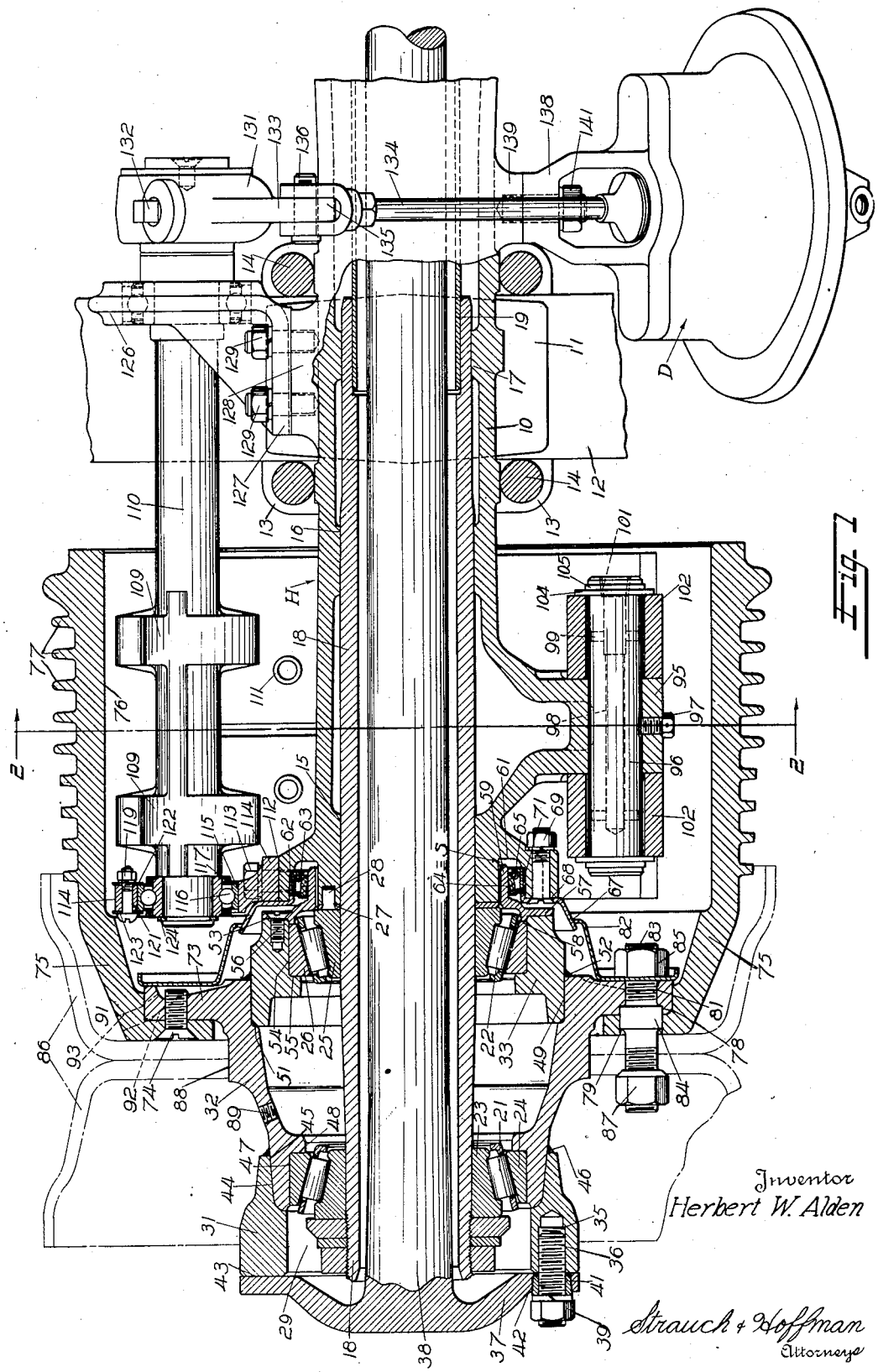

2,287,009

UNITED STATES PATENT OFFICE 2,287,009

HUB CONSTRUCTION

Herbert W. Alden, Detroit, Mich., assignor to The Timken-Detroit Axle Company, Detroit, Mich., a corporation of Ohio Application June 16, 1939, Serial No. 279,557

2 Claims. (Cl. 301—105)

This invention relates to axle constructions and more particularly axles for automotive use.

The hubs of axles now in use usually demountably carry wheel and brake drum assemblies and the hubs are each journalled on the axle housings by means of a pair of ball or roller bearing units. The hubs carry the entire load of the vehicle and also, since they are a part of the axle, are unsprung and directly transmit road shocks to the axle housings. The hubs are, accordingly, subjected to considerable stress in normal service, and in the case of trucks and buses they are subjected to such severe stresses and strains that they sometimes fail.

Heretofore, it has been the practice to cast hubs of intricate shape. Since cast metal is inferior in every way to forged, rolled or drawn metal, the industry has long sought to avoid the inherent weaknesses of cast hubs.

It is accordingly the major object of this invention to provide a forged axle hub, which is extremely strong, successfully withstands all the various stresses to which it is subjected in service, and yet which may be cheaply produced.

A further important object is to provide an axle hub made up of a plurality of forgings rigidly secured together as a strong, rigid, unitary structure.

A further object is to construct axle hubs of a plurality of forged parts, and to so design certain of them that different type hubs may be built up from the same base parts.

Further objects will become apparent as the specification proceeds in connection with the annexed drawings, and from the appended claims.

In the drawings:

Figure 1 is a longitudinal sectional view through an axle construction embodying the invention, and the section has been taken along a generally horizontal plane, with the parts viewed from above;

Figure 2 is a vertical sectional view taken of the axle construction shown in Figure 1, the section being taken substantially along line 2—2 of that figure, looking in the direction of the arrows;

Figure 3 is a view somewhat similar to Figure 1, but the brake mechanism has been omitted and it illustrates a modified form of hub construction also forming part of the invention.

With continued reference to the drawings, wherein like reference characters have been employed to designate like parts throughout the several views thereof, I have illustrated the invention as being embodied in a rear axle construction of heavy duty design for buses and trucks, although it is to be understood that it may be used to great advantage in light vehicles of the pleasure car class and also in front axle constructions.

A housing member H is provided with an elongated portion 10, which is generally rectangular in section, and carries an integral spring supporting pad 11. A conventional vehicle spring 12 is secured to spring pad 11 by means of a plate 13 and a pair of U-bolts 14 in well known manner.

Provided on the interior of the housing are a plurality of annular bosses 15, 16 and 17, which are accurately reamed to tightly receive a sleeve 18, one end of which projects beyond the housing to form what is known in the trade as the axle arm. It may be secured in place by set screws or the like (not shown). The other end of the sleeve is recessed to receive a light tubular member 19, which cooperates with the housing and with the differential casing (not shown) to define a small capacity lubricant chamber in well known manner.

Journalled on the axle arm by means of roller bearings 21 and 22 is the novel forged hub of my invention. Bearing 21 is provided with an inner race 23 fitting over the axle arm and an outer race 24. Bearing 22 is provided with an inner race 25 supported on the axle arm, and an outer race 26 which is carried in the hub. Bearing race 25 bears against a steel or bronze ring 27, which is non-rotatably secured to the housing by means of a pin 28. The inner race 23 of bearing 21 is retained in place on the axle arm by means of an adjustable lock nut assembly 29 of any well known construction.

The novel forged hub assembly of the invention is made up of a cap part 31 to which the axle proper is secured; an intermediate flange portion 32, in which one of the bearings is carried and which supports the brake drum and the wheel assembly; and an end portion 33 which carries the other bearing and the sealing assembly.

Each of parts 31, 32 and 33 is an independently forged metal member of great strength and they are rigidly secured together to form a unitary hub which is far superior to a cast hub construction and is also stronger than a hub made up of a single forging, even if it were possible and practical to so construct it, because the finished structure comprises a plurality of parts which are telescoped or overlapped to afford double thicknesses of metal in the regions of greatest stress.

A further advantage of the forged hub is that its parts may be forged almost to exact dimensions, with the result that a minimum of machining is required prior to assembling it. The forged hub is also of much lighter weight than a cast hub of comparable capacity. Also, by making the hub of a plurality of forgings, by employing the same basic hub forgings with different adaptors, the hubs for many different sized axles may be made up.

Cap member 31 is provided with a plurality of tapped openings 35 in which studs 36 are secured. Flange 37 of an axle 38 is secured to member 31 by nuts 39 turned on studs 36. In order to provide a tight driving fit between the studs and the flange a split dowel assembly 41 encircles each stud and bears tightly against the walls of opening 42 formed in the axle flange. The only surfaces requiring machining are face 43 against which the axle flange seats, and an internal tapered and curved surface 44 into which a correspondingly shaped surface 45 of intermediate member 32 is tightly fitted. The forgings are preferably fitted together and secured in assembled relationship by an annular weld 46.

Member 32 is internally machined at one end to provide surfaces 47 and 48 which retain outer bearing race 24 in place. The other end of member 32 is machined to provide a cylindrical surface 49 and an abutment 51. The outer surface of member 33 and the end wall thereof are accurately machined to provide a tight fit against walls 49 and 51. When the parts are telescoped they are secured together in rigid assembled relationship by means of an annular weld 52. Member 33 is also machined to provide an end face 53, an internal surface 54, and an abutment 55, the latter surfaces retaining outer bearing race 26 in place.

The hub assembly is therefore constituted of several independently forged pieces, yet when assembled as just described, it forms an extremely strong unitary member which is superior in all respects to a cast hub. Also, in view of the comparatively simple sections involved, the hub parts may be inexpensively forged to approximately final dimensions, so that only a minimum amount of metal need be removed in the necessary machining operations.

Although I have illustrated walls 44 and 45 as being tapered, they may be cylindrical in form, and the joint formed similar to that disclosed between members 32 and 33, without departing from the spirit of the invention. Also, the forgings are preferably externally welded together because it may be effected in a simple operation and provides a weld of maximum diameter and maximum strength for hub parts of given size, but it is to be understood that the hub parts may be additionally internally welded to provide greater torque capacity. In some instances, members 31 and 32 may be made as an integrally forged piece, and this form of the invention will be later disclosed more in detail. In either event the hub parts are forged, then normalized and machined, and finally press or shrink-fitted and welded together. Some steels, such as S. A. E. 1030 and 1040, do not require normalizing, and when these steels are used this step may be omitted.

Secured to the end of member 33 by means of a plurality of flat headed screws 56, is a combined bearing retainer and seal member 57, having an annular lip 58, which abuts outer bearing race 26 and retains it in place. Member 57 is also provided with an axially directed flange 59, which seats in a comparatively large annular recess 61 in housing H, and has a smoothly cylindrical outer surface and cooperates with a sealing assembly S. The sealing assembly is also mounted in groove 61 and may be of any well known construction. In this instance the sealing assembly has been illustrated as comprising a pair of interfitting members 62 and 63 fitting within groove 61, and carries a sealing member 64. The latter is urged into tight sealing engagement with the flange 59 by means of a spring 65.

Member 57 accordingly cooperates with sealing assembly S to prevent lubricant leakage from the interior of the hub, and as it extends inwardly a considerable distance beyond the orbit of bearing travel, it provides an annular groove in which lubricant is centrifugally retained during operation, and this in turn reduces the pressure to which the sealing assembly is subjected.

In order to prevent any lubricant that may get past the seal from finding its way to the braking surface of the brake drum, an annular flinger member 67 is secured in fluid tight engagement with an annular face 68 of the housing by means of a plurality of nut and bolt assemblies 69. Flinger member 67 is also provided with an internal lip 71, which extends a short distance in the groove 61 and retains the seal assembly in place.

The hub is provided with a large flange 73 which is preferably machined all over, and secured to one face of it by means of a plurality of flat headed screws 74, is a brake drum 75, having an internal braking surface 76 and a plurality of external heat-dissipating fins 77.

Referring to the lower part of Figure 1, brake drum 75 and hub 73 are provided with aligned openings 78 and 79, respectively. Openings 78 merge into smaller diameter openings, 81, so as to provide shouldered stud openings. A secondary glinger ring 82 tightly engages one side of flange 73 and is secured thereto by means of a plurality of studs 83, which have enlarged portions 84 seating in openings 78 and 79. A nut 85 is threaded onto each stud and when pulled home they hold flinger 82 in fluid tight engagement with flange 73 and they also rigidly anchor each stud in the flange, by reason of the engagement of enlarged portions 84 with the shoulders.

In the drawings I have illustrated a dual wheel assembly 86, which may be demountably secured to the hub and brake drum assembly by means of nuts 87 threaded onto studs 83. The wheels are preferably pivoted upon a cylindrical surface 88 machined on central member 32 of the hum. Lubricant may be introduced into the hub by any suitable means, such as by a grease fitting tapped into an opening 89 in member 32.

With further reference to the oil seal and flinger construction, any lubricant escaping past the seal in operation will gravitate down over the edge of stationary shield 67 onto the conical inner wall of rotating shield 82 and will be centrifugally thrown toward the hub. At predetermined spaced intervals, hub 73 is provided with a recess 91, each of which communicates with a passage 92 formed in the flange. Passages 92 are in turn each aligned with a passage 93 formed in the brake drum. Therefore, any lubricant caught on deflector 82 will find its way into recesses 91 and will then be discharged from the wheel through passages 92 and 93, thereby precluding contaminating the brake drum and lining with lubricant.

Another important feature of the present invention resides in the novel brake mechanism disclosed. It comprises generally a double brake anchored to an integral part of the axle housing and actuated by cams which are carried by a cam shaft mounted in anti-friction bearings, which makes for an extremely sturdy and reliable brake mechanism and one that will stand up under abuse in service.

As seen in Figure 2, housing H is generally rectangular in shape and inside of the brake drum it is provided with an integral offset portion 95 in which a pair of anchor pins 96 are secured by means of a pair of cap screws 97, which cooperate with flat portions on the pins. The pins are each provided with a longitudinal passage 98, transverse passages 99 and a tapped opening 101 for a grease fitting, to provide for lubrication of the brake shoe pivots. Pivoted on pins 96 are a pair of lower brake shoes 102 and a pair of upper brake shoes 103, which are secured in place by means of a pair of washers 104 and a pair of split rings 105, the latter being sprung into grooves formed in the pins adjacent the ends thereof. Each brake shoe carries a pair of segmental lining members 106, which are secured thereto in any well known manner. The brake shoes are accordingly rigidly anchored but freely journalled on a rigid portion of the housing and an extremely sturdy and rugged structure is provided.

Each pair of upper and lower brake shoes carries a roller 108, which cooperates with a pair of S-shaped cams 109, preferably integrally formed with a cam shaft 110. As seen in Figure 2, the cam shaft has been rocked counter-clockwise slightly away from neutral or disengaging position to engage the shoes with the inside of the brake drum. A tension spring 111 is connected to each pair of brake shoes for urging their free ends toward their respective cams, so that when the cam shaft is brought to neutral position the brake shoes will be positively withdrawn from engagement with the brake drum.

Cam shaft 110 is mounted in novel manner for extremely free rotation and yet is adequately supported at all times in true alignment with respect to the brake shoes.

Pulled into tight engagement with a flat face 112 provided on housing H, by means of a pair of cap screws 113, is a bracket member 114 having a large opening 115 provided therein. Mounted in opening 115 is the outer race of a ball bearing assembly 116. Bearing 116 per se is of a type well known in the trade and is lubricated for life and includes built-in oil seals 117 for continuously maintaining a supply of lubricant in the bearing.

The bearing is retained in place by means of a bolt and nut assembly 119, which passes through an opening 121 in bracket 114 and retains a pair of washers 122 and 123 in tight engagement with opposite sides of the outer bearing race. The inner race of the bearing fits over a reduced end of the cam shaft by means of a split ring 124, which is sprung into a groove in the reduced end of shaft 110.

The other end of the cam shaft is journalled in an exactly similar ball bearing carried by a bracket 126, having an offset portion 127 which is secured to a flat portion 128 of the housing by means of a plurality of stud and nut assemblies 129.

Mounted on the end of shaft 110 is a slack adjuster 131, embodying an adjusting screw 132 for adjusting the brake shoe clearance to compensate for wear of the linings. However, the slack adjuster forms no part of the present invention per se and is shown and claimed in Patent No. 2,001,239 to Laurence R. Buckendale, dated May 14, 1935, it will not be further described.

The slack adjuster assembly terminates in a lever 133, which is connected to a diaphragm rod 134 by means of a device 135 and a pin 136.

Although the brake may be manually actuated, I preferably employ a pneumatically actuated diaphragm and diaphragm casing assembly designated as D, for operating the brake. The diaphragm is connected to rod 134, so that upon admission of air under pressure through a pipe 137, lever 133 and shaft 110 will be rocked counter-clockwise (Figure 2) to apply the brakes. The diaphragm casing is provided with a bracket portion 138, which is secured to a flat portion 139 provided on the side of the housing H, by means of a plurality of nuts 141 and studs 142.

In Figure 3 I have illustrated an axle construction embodying a modified form of forged hub assembly, and the major difference between it and that shown in Figures 1 and 2 is the use of a two-part hub construction instead of three pieces.

The axle construction illustrated is for a front wheel drive vehicle, but it is obvious that the hub construction illustrated can also be used in rear wheel drive axle construction or an idle front wheel assembly. It embodies a hollow axle arm 151, which carries the inner races 152 and 153 of a pair of roller bearings 154 and 155 respectively. Race 152 is adjustably held in place on arm 151 by means of a lock nut assembly 156. The bearings rotatably support a generally cylindrical forged member 157 which is so shaped that it may be formed in a simple forging operation. It is provided with an internal flange 158 which constitutes an abutment for the outer race 159 of bearing 155, and it has a smooth internal face 161 which cooperates in sealing engagement with seal ring 162 carried by a stationary member 163.

Forging 157 is also provided with a shoulder 165 which provides an abutment for a ring member 166, which is preferably force fitted in place and may be welded to the hub if desired to more positively hold it. Member 166 is provided with an annular cylindrical surface 167 and an abutment 168, which cooperate to firmly hold the outer race 169 of bearing 154 in position in the hub.

By designing member 157 so that it may be forged in a relatively simple operation, and providing an auxiliary member 166 to form a seat for the other bearing, I have made it possible to provide a simple two-part forged hub. Member 166 may be forged and then machined to proper internal and external dimensions, but in view of the fact that it is merely a compression member, it may be of cast construction, if desired.

Member 157 is provided with a flange 171, which is preferably machined all over. Secured to flange 171 by means of a plurality of flat headed countersunk bolts 172 and nuts 173 is a brake drum 174. A plurality of studs 175, having shoulders 176, are secured in aligned openings in the flange and brake drum by means of nuts 177. A wheel assembly designated as 178 may be secured against the flange by means of nuts 179 threaded on studs 175. An axle shaft flange 180 is secured to the end of the hub by means of cap screws 181.

Although I have illustrated the hub in Figure 3 as being associated with a front axle of a four wheel drive vehicle, it is to be understood that it may be readily employed with a conventional idle front axle construction, varying the dimensions of the parts, if necessary.

As an example of the adaptability of the forged hub assembly of the invention to axles of various sizes and heights, and with particular reference to Figure 3, member 157 may be regarded as the basic hub member and it may be forged so as to leave considerable excess metal on the flange and on the inner surface of the hub, so that on one design of axle construction it may be given a light machine cut to provide a large hub and the internal surface may be machined to accommodate a large bearing support 166, and it may also be machined to provide a large diameter cylindrical surface for a bearing 155 of large capacity. This procedure will result in a large capacity hub assembly. On the other hand, if it is desired to construct a lighter hub construction from the same basic member 157, a heavy machine cut may be taken off the flange to reduce it to the proper dimension, and the interior machined to receive the correspondingly lighter parts.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A hub assembly comprising a hollow annular forging having an exterior flange and a plurality of spaced internal walls each terminating in an outwardly facing shoulder, the latter being of different diameters; a ring-like forging fixedly seated against one of said shoulders in telescopic engagement with the corresponding internal wall and having an internal wall ending in an outwardly facing shoulder, the flange on said hollow forging providing means for attaching a wheel, and the other internal wall and shoulder of said forging and the internal wall and shoulder of said ring-like forging being operable to receive bearings for rotatably supporting the hollow forging.

2. A hub assembly comprising a hollow annular forging having a substantially cylindrical portion and an exterior flange for supporting a wheel; the interior of said forging having a plurality of axially spaced internal walls terminating in outwardly facing shoulders of different diameters, one of said walls and its associated shoulder providing means for receiving a bearing race; a first ring-like forging fixedly seated against the other of said shoulders in telescopic engagement with the corresponding internal wall and having an internal wall ending in an outwardly facing shoulder for receiving a bearing race; and a second ring-like forging affixed to the forging in telescopic engagement therewith and being provided with means for engaging the outboard end assembly of a driving axle shaft.

HERBERT W. ALDEN.